United States Patent
Walton et al.

(10) Patent No.: US 6,621,476 B2
(45) Date of Patent: Sep. 16, 2003

(54) METHOD OF DRIVING A LIQUID CRYSTAL DISPLAY DEVICE, AND A LIQUID CRYSTAL DISPLAY DEVICE

(75) Inventors: Harry Garth Walton, Oxford (GB); Michael John Towler, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 09/730,484

(22) Filed: Dec. 5, 2000

(65) Prior Publication Data

US 2001/0005192 A1 Jun. 28, 2001

(30) Foreign Application Priority Data

Dec. 7, 1999  (GB) ............................................... 9928761

(51) Int. Cl.[7] ............................. G09G 3/36; C09K 19/02
(52) U.S. Cl. .............................. 345/87; 345/89; 349/172
(58) Field of Search ..................... 345/87–89, 94–100, 345/208, 209; 359/53, 55; 340/767; 349/172

(56) References Cited

U.S. PATENT DOCUMENTS

| | | | |
|---|---|---|---|
| 4,566,758 A | | 1/1986 | Bos |
| 4,635,051 A | | 1/1987 | Bos |
| 4,773,716 A | | 9/1988 | Nakanowatari |
| 4,836,654 A | | 6/1989 | Fujimura et al. |
| 5,093,736 A | * | 3/1992 | Iijima ........................... 345/87 |
| 5,457,551 A | * | 10/1995 | Culter et al. .................. 345/87 |
| 5,900,852 A | * | 5/1999 | Tanaka et al. ................ 345/87 |
| 6,046,790 A | * | 4/2000 | Hara et al. ................... 349/172 |
| 6,172,661 B1 | * | 1/2001 | Imajo et al. ................... 345/89 |
| 6,243,063 B1 | * | 6/2001 | Mayhew et al. ............... 345/87 |
| 6,414,666 B1 | * | 7/2002 | Yamakawa et al. ........... 345/87 |
| 6,417,826 B1 | * | 7/2002 | Bonnett et al. ............... 345/87 |

FOREIGN PATENT DOCUMENTS

| | | |
|---|---|---|
| EP | 0 149 899 | 12/1984 |
| EP | 0 469 893 | 7/1991 |
| EP | 0 735 015 | 1/1996 |
| EP | 0 816 906 | 6/1997 |

OTHER PUBLICATIONS

European Search Report dated Oct. 31, 2002 for corresponding Application No. 00310832.1.
Nakamura et al.: "A Novel Wide–Viewing–Angle Motion–Picture LCD" 1998, May 17, 1998, pp. 143–146.
Sueka et al.: "Improving the Moving–Image Quality of TFT–LCD's", Sep. 19, 1997, pp. 203–206.

\* cited by examiner

*Primary Examiner*—Bipin Shalwala
*Assistant Examiner*—Prabodh M. Dharia
(74) *Attorney, Agent, or Firm*—Renner, Otto, Boisselle & Sklar (57) ABSTRACT

A display device and method driving a display device makes use of the dynamic variation in the brightness of a surface mode liquid crystal device cell having a liquid crystal layer with a non-zero twist angle. The liquid crystal layer is switched before the equilibrium value of the brightness has been reached, so as to make use of the non-equilibrium increased brightness and so increase the brightness of the display.

25 Claims, 9 Drawing Sheets

Splay state,
0 voltage

FIG 1a

Bend state,
lower voltage

FIG 1b

Bend state,
high voltage

METHOD OF DRIVING A LIQUID CRYSTAL DISPLAY DEVICE, AND A LIQUID CRYSTAL DISPLAY DEVICE

BACKGROUND OF THE INVENTION

1. Field of the Invention

The present invention relates to a method of driving a liquid crystal display device, and in particular to a method of driving a surface mods LCD such as a pi-cell device. It also relates to a liquid crystal display device.

2. Description of the Related Art

Figure 1A:
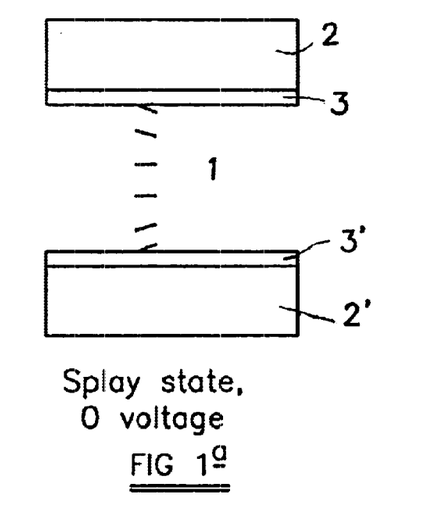
FIG. 1(a) is a schematic sectional view of a zero-twist pi-cell under the condition of no applied voltage.

The pi-cell (otherwise known as an "optically compensated birefringent device" or OCB) is described in "Mol. Cryst. Liq. Cryst.", 1984, Vol 113, p329–339, and In U.S. Pat. No. 4,635,051. The structure of a pi-cell is schematically illustrated in FIG. 1(a). The device comprises transparent substrates 2, 2' on which are disposed alignment layers 3, 3'. A layer of nematic liquid crystal 1 is disposed between the substrates 2, 2'.

The alignment layers 3, 3' create parallel alignment of the liquid crystal molecules in the liquid crystal layer 1 at its boundaries with the alignment layers 3, 3'. This can be achieved by using parallel-rubbed polyamide alignment layers. The pretilt induced by the alignment layers is generally under 45° and is typically in the range 2° to 10°.

Addressing electrodes (not shown) are provided on the substrates 2, 2', so that an electric field can be applied to selected areas of the liquid crystal layer.

FIG. 1(a) shown the device when no electric field is applied across the liquid crystal layer. The liquid crystal is in an H-state (homogenous state, also known as a splay state), in which the liquid crystal molecules in the centre or the liquid crystal layer are substantially parallel to the substrates. The short lines in the figure represent the director of the liquid crystal molecules.

Figure 1B:
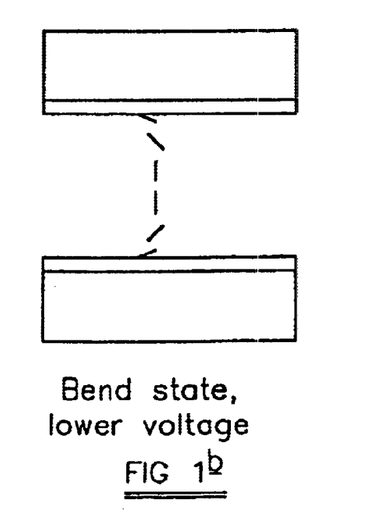
FIG. 1(b) is a schematic view of the device of FIG. 1(a) when a low voltage is applied across is the liquid crystal layer.
Figure 1C:
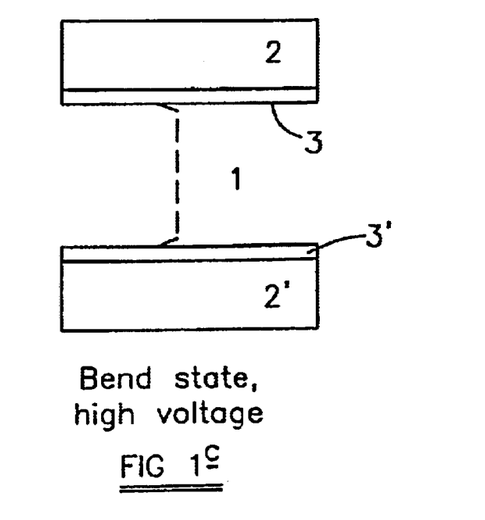
FIG. 1(c) is a schematic view of the device of FIG. 1(a) when a larger voltage is applied across the liquid crystal layer.

When an electric field greater than a threshold value is applied across the liquid crystal layer, the liquid crystal molecules adopt a V-state (or a bend state). In this state, the liquid crystal molecules in the centre of the liquid crystal layer are substantially perpendicular to the substrates. FIG. 1(b) shows a first V-state which occurs at a low applied voltage across the liquid crystal layer, and FIG. 1(c) shows a second V-state which occurs when a higher voltage is applied across the liquid crystal layer. The pi-cell is operated by switching the liquid crystal layer between the first, low voltage V-state and the second, higher voltage V-state.

As can be seen by comparing FIGS. 1(b) and 1(c), modulating the electric field applied across the liquid crystal layer causes the director of liquid crystal molecules close to the substrates to be reoriented, while the directors of liquid crystal molecules in the central region (in the thickness direction) of the liquid crystal layer remain substantially perpendicular to the plane of the substrates. For this reason, the pi-call is known as a surface mode device, and operates with the director in a bend state. Surface mode LCDs are disclosed in "Sov. J. Quant. Electronics", 1973, Vol 3, page 78–79.

Surface mode devices have the advantage that they tend to exhibit a more rapid electro-optic response than most other nematic liquid crystal devices. Since liquid crystals have optically anisotropic properties, placing a pi-cell between two polarisers and varying the voltage applied across the liquid crystal layer causes a variation in the optical transmission, and this makes possible the formation of a light modulating device. For example, a pi-cell may be placed between linear polarisers whose transmission axis are crossed with one another and are at 45° to the optic axis of the liquid crystal layer. Alternatively, a pi-cell may be arranged to operate in a reflective mode using only a single polariser.

One known problem is that when the electric field across the liquid crystal layer is reduced below the threshold voltage for the transition from the H-state to the V-state, the directors of the liquid crystal molecules adopt the H-state, or splay-state, shown in FIG. 1(a). The transition from this 0V splay-state to the required operating state is slow, and when a display device that incorporates a pi-cell is turned on there is a delay before the required operating state forms.

Figure 2:
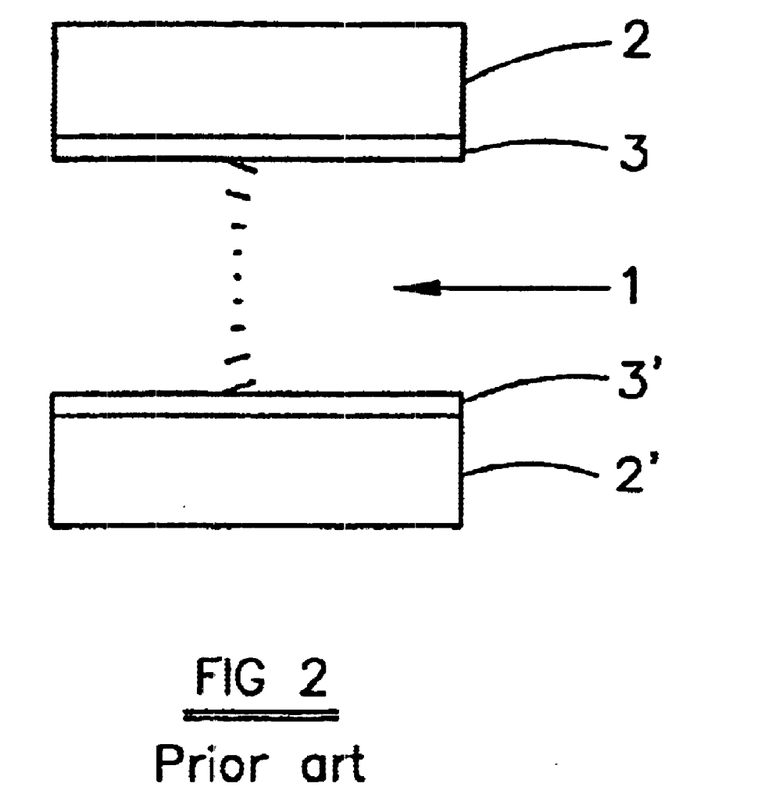
FIG. 2 is a schematic sectional view showing the liquid crystal orientation under conditions of no applied voltage in a chiral-doped pi-cell having a non-zero twist angle.

One attempt to overcome this problem, often referred to as the "nucleation problem", is described in U.S. Pat. No. 4,566,756. This patent addresses the nucleation problem by adding a chiral material to the liquid crystal, so that the liquid crystal director adopts a 180° twist state under a condition of no applied voltage. This is shown in FIG. 2. In contrast, the device illustrated in FIGS. 1(a) to 1(c) has a 0° twist angle.

When a sufficiently high voltage (typically around 3V or greater) is applied across a chiral doped pi-cell having a 180° twist angle it will exhibit an essentially identical director bend state to a non-doped, 0° twist pi-cell. In fact, a 180° twist p1-cell does not reach a true bend state (that is, a state where the director in the central region of the liquid crystal layer is perpendicular to the substrates) at any finite voltage. However, at high applied voltages the liquid crystal state of a 180° twist pi-cell is a good approximation to a band state. In contrast, at low voltages (typically around 3V or below), a chiral doped pi-cell and a non-doped pi-cell will differ significantly in their operating properties.

Although a chiral doped 180° twist state pi-cell of the type disclosed in U.S. Pat. No. 4,566,756 overcomes the nucleation problem, it has the disadvantage that the voltage applied over the pi-cell must remain above a certain level (typically around 3V or above) to ensure that the device operates in a surface mode. For example, if the voltage applied to such a device were switched between 0V and 10V the director of liquid crystal molecules in the centre of the liquid crystal layer would switch between 0° (that is, parallel to the substrates) and substantially 90° (that is, substantially perpendicular to the plane of the substrates). The device clearly would not then perform as a surface mode switching device, and thus would not achieve the high speed of operation expected for a surface mode device.

In order for the pi-cell disclosed in U.S. Pat. No. 4,566,756 to function as a surface mode device and thus retain the short switching time associated with a surface mode device, it is necessary for the voltage applied across the pi-cell not to fall below around 3V. This requirement means that the full range of optical response of liquid crystal is not available. In particular, bright regions of the optical response curve may not be available.

Figure 3:
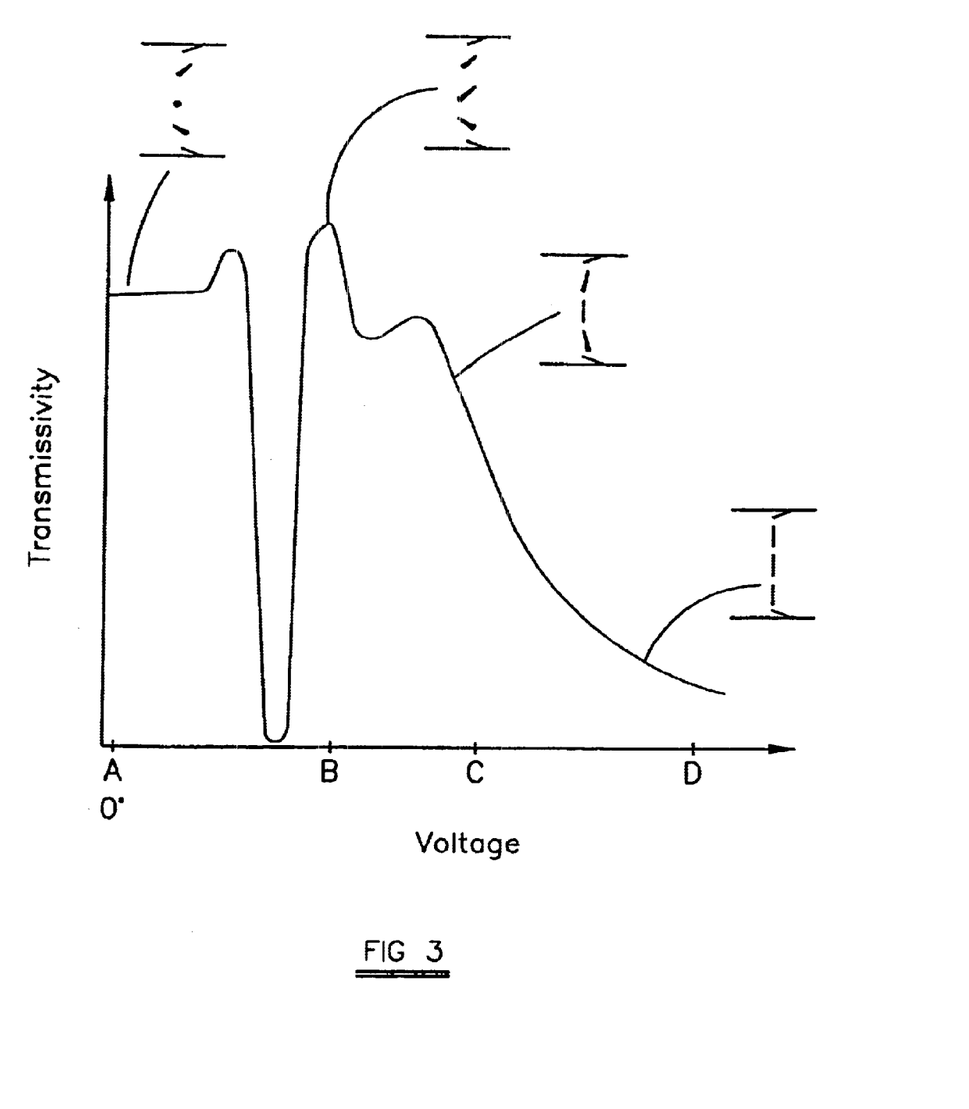
FIG. 3 is a schematic curve of the equilibrium transmissivity against applied voltage for the device of FIG. 2.

FIG. 3 is a schematic illustration of the relationship between equilibrium optical transmissivity of a chiral doped 180° twist pi-cell against the voltage applied across the cell. Curves of this sort are routinely used to determine the voltages that should be applied across a liquid crystal layer in a display device. The inserts in FIG. 3 schematically show the director configuration of the liquid crystal molecules for various applied voltages.

When voltage D its applied across the liquid crystal layer, the display has a low transmissivity, and the director of liquid crystal molecules in the centre of the liquid crystal layer is predominantly perpendicular to the cell substrates. That is, the liquid crystal state is a close approximation to a bend state. In contrast, when a voltage close to zero (voltage A) is applied across the liquid crystal layer, it adopts a 180° twist state, and the director of the molecules in the centre of the liquid crystal layer is parallel to the plane of the substrates. At intermediate voltages, the liquid crystal undergoes a complex variation in its optical transmissivity as the molecules re-orient themselves under the action of the applied voltage.

It will be seen that the transmissivity of the pi-cell only slowly tends towards zero as the applied voltage increases. It may therefore be desirable to incorporate a fixed retarder in a pi-cell, so that zero transmissivity is obtained at a finite applied voltage.

From a consideration of just the transmissivity of the liquid crystal device, it might appear most favourable to drive the liquid crystal device between a voltage such as D, where the liquid crystal device has a low transmissivity, and a voltage such as B where the liquid crystal device has a high, close to 100%, transmissivity in order to maximise the contrast. However, when voltage B is applied across the liquid crystal layer the orientation state of the liquid crystal molecules is not close to a bend state, since the director of liquid crystal molecules in the centre of the liquid crystal layer deviates significantly from the direction perpendicular to the substrates of the device. Thus, if the device were operated by switching the applied voltage between B and D, the device would not operate as a surface mode device, and would not achieve the rapid switching of a surface mode device. In order to operate the device in the surface mode it is necessary to vary the voltage between C and D to ensure that the central director remains substantially perpendicular to the substrates. Although operating the device in this way achieves rapid switching, it has the disadvantage that the maximum transmissivity of the display device that can be obtained is well below 100%, and this reduces the brightness and contrast of the display.

EP-A-0 149 899 discloses a method of driving a ferroelectric liquid crystal display device. A direct current voltage is applied across the liquid crystal layer to provide the liquid crystal layer with a first transmissivity. The transmissivity of the ferroelectric liquid crystal layer is then altered, by applying an alternating current voltage across the liquid crystal layer. The alternating current voltage has a different magnitude to the previously-applied direct current voltage.

U.S. Pat. No. 4,773,716 discloses a method of driving a ferroelectric liquid crystal display device. Two or more high voltage pulses are applied to put the ferroelectric liquid crystal layer into a particular state and, once this has been done, pulses having a lower voltage are applied to maintain the ferroelectric liquid crystal in the selected state for the remainder of a frame.

SUMMARY OF THE INVENTION

A first aspect of the present invention provides a method of driving a surface-mode liquid crystal display device including a liquid crystal layer having a non-zero twist angle, the method comprising the stop of: applying a first voltage having a first magnitude across the liquid crystal layer to put the liquid crystal layer into a first liquid crystal state; the method being characterised in that it further comprises changing the magnitude of the voltage applied across the liquid crystal layer while the brightness of the liquid crystal display device is greater than the equilibrium brightness value associated with the first liquid crystal state.

It has been found that if the voltage applied across a liquid crystal layer of a surface mode liquid crystal display device having a non-zero twist angle liquid crystal layer is changed the brightness does not change monotonically. For example if the applied voltage is reduced in order to increase the brightness of the liquid crystal device, the brightness of the liquid crystal device does not rise monotonically to the new equilibrium value. Instead, the brightness rises rapidly to a value that is greater than the equilibrium value, and then slowly decreased to the equilibrium value. If the voltage applied across the liquid crystal layer is subsequently changed while the brightness of the liquid crystal device is greater than its equilibrium value, the brightness of the display can be increased. In the case of a transmissive display device the transmissivity is increased and in the case of a reflective device the reflectivity is increased.

The step of changing the magnitude of the voltage applied across the liquid crystal layer may be performed before the director of liquid crystal molecules in the centre in a thickness direction of the liquid crystal layer has substantially reached its equilibrium orientation associated with the first liquid crystal state.

The step of changing the magnitude of the voltage applied across the liquid crystal layer may be carried out after no more than 50% of the time required for the brightness of the liquid crystal device to reach substantially the equilibrium value associated with the first liquid crystal state. The magnitude of the voltage applied across the liquid crystal layer may be changed after approximately 32% of the time required for the brightness of the liquid crystal device to reach substantially the equilibrium value associated with the first liquid crystal state. The magnitude of the voltage applied across the liquid crystal layer may be changed no later than approximately 16 msec after the step of applying the first voltage. In these cases, the voltage applied across the liquid crystal layer is changed before the brightness of the liquid crystal device has decayed to its equilibrium value, so that the brightness of the display is increased.

The method may further comprise the step of putting the liquid crystal layer into a known liquid crystal state before performing the step of applying the first voltage. The step of putting the liquid crystal layer into a known liquid crystal state may comprise applying a blanking voltage to the liquid crystal layer. This enables reproducible grey scale levels to be obtained.

The magnitude of the blanking voltage may be dependent on the temperature of the liquid crystal layer. As the temperature of the liquid crystal layer varies, the viscous properties of the liquid crystal layer will change. Varying the magnitude of the blanking voltage with the temperature of the liquid crystal layer will compensate for any changes in the viscous properties of the liquid crystal layer.

The liquid crystal layer may contain a chiral dopant. The pitch induced by the chiral dopant in the liquid crystal may decrease with temperature. This is an alternative way to counteract the increase in viscosity of a liquid crystal material that generally occurs as the temperature rises.

The chiral dopant may induce a twist in the director of the liquid crystal molecules having a pitch p such that $d/p=0.25$, where d is the thickness of the liquid crystal layer. Alternatively, the chiral dopant may induce a twist in the director of the liquid crystal molecules having a pitch p such that $d/p \geq 0.25$, where d is the thickness of the liquid crystal layer. The chiral dopant may induce a twist in the director of the liquid crystal such that $0.25 \leq d/p \leq 0.5$. A lower d/p ratio results in less temporal variation in the brightness of the liquid crystal display device once the peak brightness has been reached. For a relatively long frame time, use of a liquid crystal layer with a low d/p ratio will minimise variations in brightness over the duration of the frame.

The twist angle of the liquid crystal layer may be substantially 180°.

The liquid crystal display device may be an active matrix display device comprising an array of pixels, each pixel being defined by a corresponding pixel electrode, M strobe electrodes and N signal electrodes, and the method may comprise, in a frame, the steps of:

(a) applying a blanking voltage to each of the pixels;
(b) applying a respective signal voltage corresponding to desired image data to each of the pixels;
(c) allowing the liquid crystal molecules to switch states; and
(d) displaying the image.

The step (a) may comprise applying the blanking voltage substantially simultaneously to all pixels. Alternatively, the step (a) may comprise applying the blanking voltage to pixels associated with each strobe electrode in sequence.

The step (b) may comprise applying the signal voltages to pixels associated with each strobe electrode in the sequence 1, 3, 5 . . . M, M−1, M−3, . . . 6, 4, 2 (M odd) or 1, 3, 5 . . . M−1, M, M−2, . . . 6, 4, 2 (M even). By addressing the strobe electrodes in this way, any brightness variation in a particular row of pixels will tend to be compensated by adjacent rows of pixels, since adjacent rows of pixels will be addressed at different times and so will be at different points along the characteristic curve of the transmissivity against time.

The combined duration of steps (a) to (d) may be substantially 16 msec and the duration of step (c) may be substantially 7 msec.

The display device may comprise a backlight, and the backlight may be on during all of steps (a) to (d).

The display device may comprise a backlight wherein the backlight is on for only part of a frame. The backlight may be off during step (a).

The device may be a pi-cell, and may have d/p≠0.

A second aspect of the present invention provides a surface mode liquid crystal display device comprising: a liquid crystal layer having a non-zero twist angle; means for applying a first voltage having a first magnitude across a selected portion of the liquid crystal layer to put the selected portion of the liquid crystal layer into a first liquid crystal state; and means for changing a magnitude of the voltage applied across the selected portion of the liquid crystal layer while the brightness of the part of the liquid crystal device corresponding to the selected portion of the liquid crystal layer is greater than the equilibrium value of the brightness associated with the first liquid crystal state.

These and other advantages of the present invention will become apparent to those skilled in the art upon reading and understanding the following detailed description with reference to the accompanying figures.

BRIEF DESCRIPTION OF THE DRAWINGS

Preferred embodiments of the present invention will now be described by way of illustrative examples with reference to the accompanying drawings in which.

DESCRIPTION OF THE PREFERRED EMBODIMENTS

Figure 4:
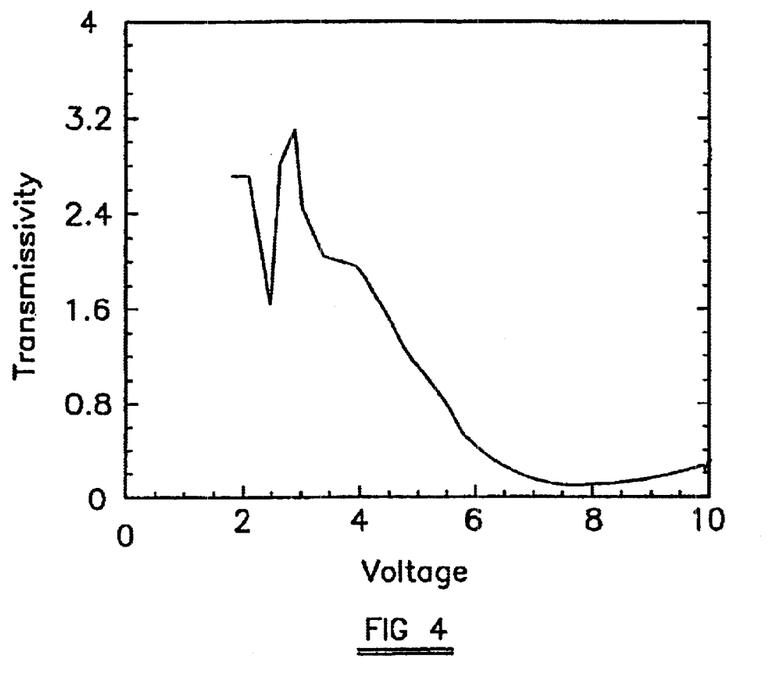
FIG. 4 illustrates the variation of the equilibrium transmissivity against applied voltage for a transmissive pi-cell incorporating a layer of chirally doped liquid crystal material E7.

FIG. 4 illustrates the transmissivity against applied voltage characteristic for a transmissive pi-cell incorporating a layer of the nematic liquid crystal material E7 (produced by Merck Limited). The basic structure of the pi-cell is the same as the prior art pi-cell shown in FIGS. 1(a) to 1(c). The liquid crystal layer has a thickness d=6.4 $\mu$m, and the pretilt angle induced by the alignment layers 3,3' is approximately 2°. The liquid crystal layer is doped with the chiral material CB 15 (produced by Merck Limited) to produce a thickness-to-pitch ratio, d/p, of 0.27 (p is the pitch of the twist induced in the director or the liquid crystal molecules by the chiral dopant). For a transmissive device, the brightness of the device is proportional to the transmissivity of the device.

The transmissivity versus voltage characteristic shown in FIG. 4 has the same general form as that shown in FIG. 3. The characteristic suggests that switching between an applied voltage of approximately 7V and an applied voltage of approximately 4V will result in a change in the transmissivity from approximately 0.25 to approximately 2 (the transmissivity is measured in arbitrary units). (It should be noted that the voltage applied to a pi-cell may be an alternating voltage, and in this case voltages mentioned are peak voltages of the a.c. waveform.)

Figure 5:
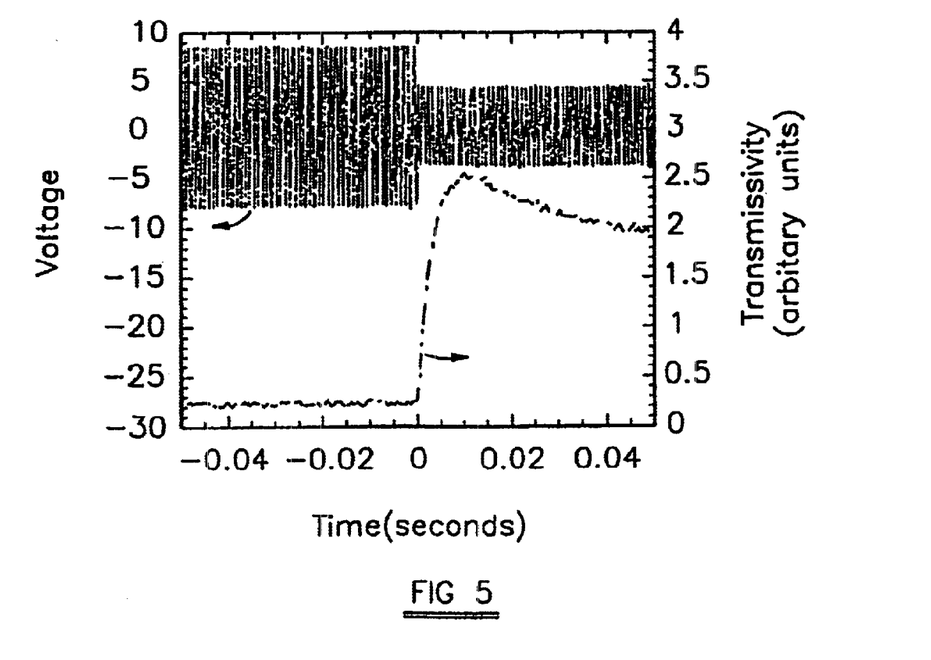
FIG. 5 shows the variation in transmissivity as a function of time when the voltage applied across the pi-cell of FIG. 4 is reduced.

FIG. 5 illustrates the variation of the transmissivity of the pi-cell of FIG. 4 as a function of time when the applied voltage is changed. The applied voltage waveform is shown in the upper trace of FIG. 5, and it can be seen that the applied voltage is an a.c. voltage and that the peak voltage of the applied a.c. voltage is reduced from approximately 8V to approximately 4V at time t=0.

The lower trace in FIG. 5 illustrates the transmissivity of the pi-cell. It can be seen that at times up to t=0—that is, at times when the applied voltage has a peak value of 8V—the transmissivity is substantially constant at around 0.25

(arbitrary units). When the magnitude of the applied voltage is reduced, the transmissivity of the liquid crystal layer does not change monotonically to the new value of approximately 2. Instead, the transmissivity rises rapidly, and reaches a peak value of around 2.5 approximately 10–15 msec after the change in applied voltage. The transmissivity then gradually decays to its equilibrium value. To be exact, the equilibrium value of the transmissivity is reached only after an infinite time, but in FIG. 5 the transmissivity has substantially reached its new equilibrium value approximately 50 msec after the change in the applied voltage. The present invention makes use of this non-equilibrium transmissivity versus time characteristic, or dynamic transmissivity characteristic, to improve the brightness of a surface mode liquid crystal display device.

The principle of the present invention is to apply a first voltage across the liquid crystal layer, and to change the voltage before the transmissivity of the liquid crystal cell has decayed to the equilibrium value induced by the first voltage. In this way, the invention makes use of the non-equilibrium region in which the transmissivity of the device is higher than the equilibrium value. For example, it will be seen that for a device having the temporal variation in transmissivity shown in the lower trace in FIG. 5, a display period that extends from 10 msec to 20 msec (that is, from 10 msec after the change in applied voltage to 20 ms after the change in applied voltage) will produce a brighter display than a display period that extends from 40 msec to 50 msec.

In one embodiment of the invention, the voltage is changed after no more than 50% of the time required for the transmissivity of the liquid crystal layer to substantially reach the equilibrium value induced by the first voltage (this corresponds to switching no more than 25 msec after applying the voltage if the time taken to substantially reach the equilibrium is 50 msec).

Alternatively, the voltage can be changed after 32% of the time required for the transmissivity of the liquid crystal layer to substantially reach the equilibrium value induced by the first voltage. This corresponds to switching after 16 msec when the time taken to reach equilibrium is 50 msec.

Of course, the preferable switching times will be determined by the exact form of the temporal variation of the transmissivity after a change in applied voltage for the particular liquid crystal material that is used.

Figure 6:
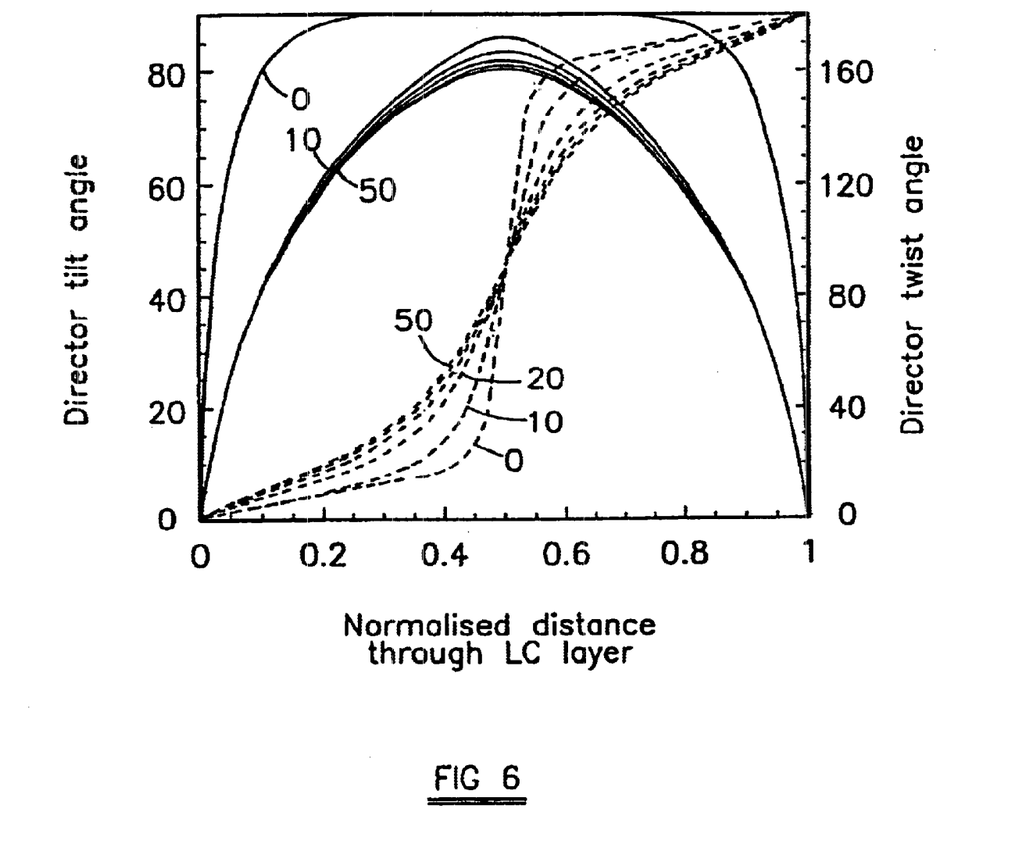
FIG. 6 shows the director tilt angle and the director twist angle for the liquid crystal layer of the pi-cell of FIG. 4 before and at various times after the applied voltage is reduced.

The dynamic variation of the transmissivity of the liquid crystal layer following a change in the applied voltage can be explained by considering the variation of the director tilt angle and the director twist angle. These are shown in FIG. 6 as a function of the distance across the liquid crystal layer (normalised to unity).

At time t=0 the liquid crystal layer is initially in equilibrium under an applied voltage of 7V. It can be seen that throughout the central region of the liquid crystal layer, and indeed throughout much of the liquid crystal layer, the director in the t=0 equilibrium state is tilted by almost 90° (the director tilt angle is shown in continuous lines and is measured with respect to the plane of the substrates, so that a 90° tilt means that the director is perpendicular to the substrates).

The broken traces illustrate the twist angle of the director. At time t=0 it will be seen that most of the 180° twist variation is confined to the central region of the liquid crystal layer.

At time t=0, the voltage across the liquid crystal layer is reduced to 2V. FIG. 6 shows the director tilt angle and the director twist angle every 10 msec after the change in applied voltage, up to the time t=50 msec. It is considered that the liquid crystal state at a time t=50 msec is substantially a new equilibrium state corresponding to the new applied voltage of 2V—ie, after 50 msec the difference between the liquid crystal state and the new equilibrium state is negligible.

It will be seen that 10 msec after the change in applied voltage the director tilt angle has relaxed almost to its equilibrium value. However, at t=10 msec the director twist angle has not reached its equilibrium value and considerable changes in the twist angle occur between t=10 msec and L=50 msec. Thus, at time t=10 msec, although the director tilt angle has largely achieved equilibrium the director is considerably less twisted than in the equilibrium state. This results in the device appearing temporarily brighter, until the director twist angle reaches its equilibrium value.

Consider driving a device having the transmissivity versus applied characteristic shown in FIG. 4 by changing the applied voltage from 8V to 4V, with the applied voltage remaining at 4V for 16 msec after which time the voltage is then changed to a new value $V_{new}$. FIG. 5 shows that at time t=16 msec after the applied voltage is changed from 8V to 4V the transmissivity of the liquid crystal layer has not yet reached its new equilibrium value, and this means that the transmissivity that will be obtained by applying the voltage $V_{new}$ is difficult to predict. For example, applying $V_{new}$ following a period for which a voltage of 4V has been applied for 16 msec will produce a different transmissivity than when $V_{new}$ is applied after a voltage of 5V has been applied for 16 msec. That is, the transmissivity obtained by applying $V_{new}$ will depend on the voltage history of the liquid crystal layer.

In order to overcome this problem, and achieve reproducible levels of transmissivity, in an embodiment of the invention the voltage applied across the liquid crystal layer is briefly changed to some known value, for example 8V on each occasion before $V_{new}$ is applied. This is known as applying a blanking voltage before applying $V_{new}$. The blanking voltage is chosen so that it will always put the liquid crystal layer into a known liquid crystal state, regardless of the liquid crystal state before the blanking voltage is applied. The subsequent application of $V_{new}$ will therefore produce a transmissivity of the liquid crystal layer which is reproducible (that is, independent of the voltage history of the liquid crystal layer before the blanking voltage is applied).

Figure 7:
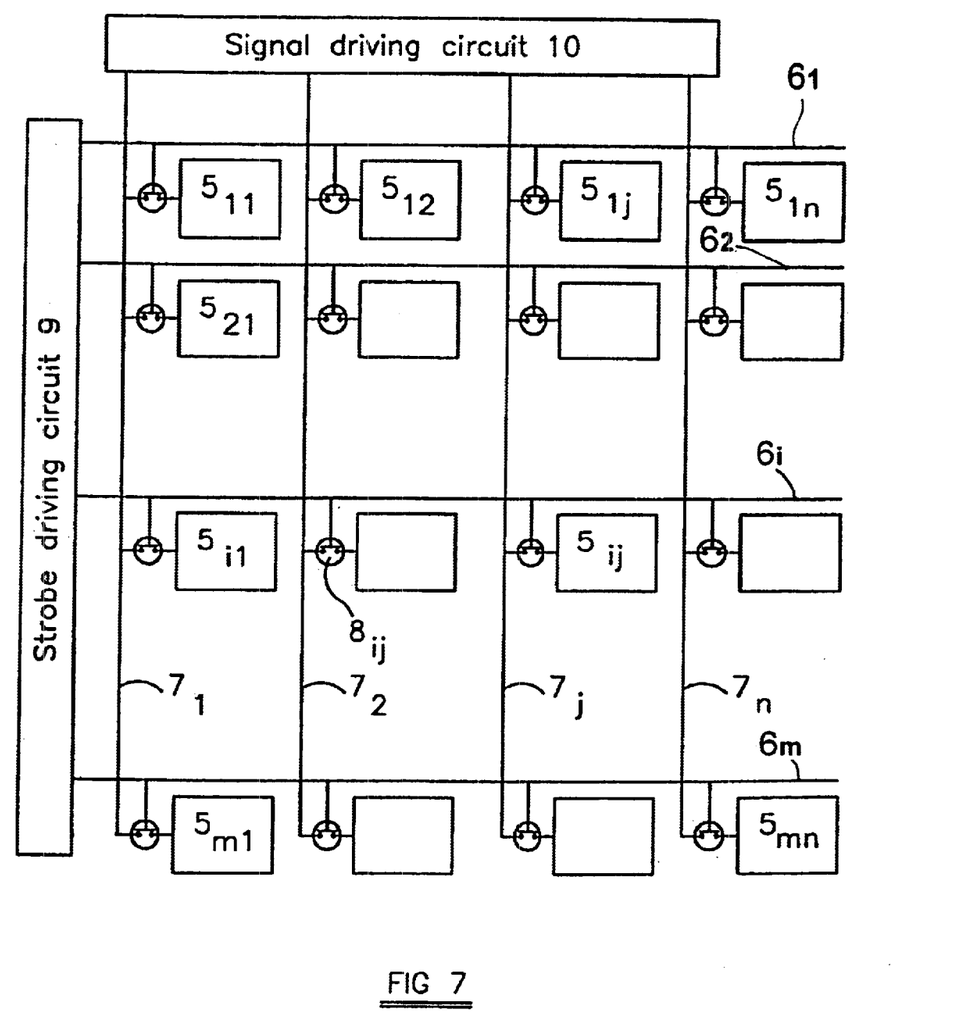
FIG. 7 is a schematic plan view of an active matrix pi-cell.

FIG. 7 schematically shows the electrode structure of an active matrix liquid crystal display device. In the case of a transmissive device, the general structure of the liquid crystal display device will be as shown in FIG. 1(a) to 1(c). The device comprises an array or pixel electrodes $5_{ij}$ that defines a corresponding array of pixels, for example arranged in a matrix of M rows and N columns. The pixel electrodes are arranged on one or the substrates of the device. A plurality of strobe electrodes $6_i$ (i=1, 2 . . . M) and signal electrodes $7_j$ (j=1, 2 . . . N) are provided on the same substrate as the pixels electrode $5_{ij}$. A common electrode (not shown) is disposed on the other of the substrates, and a liquid crystal layer is disposed between one substrate and the other substrate.

Each pixel $5_{ij}$ is connected to its associated signal electrode $7_j$ by means of a switching device such as, for example, a thin film transistor $8_{ij}$. The gate of each of the thin film transistors $8_{ij}$ is connected to an associated strobe electrode $6_i$. A strobe driving circuit 9 and a signal driving circuit 10 are provided for driving the strobe electrodes and the signal electrodes respectively. When a strobe pulse is applied by the strobe driving circuit 9 to a particular strobe electrode $6_i$, the switching elements whose gate is connected to that strobe electrode are turned on and the voltages applied by the signal driving circuit 10 to the signal electrodes at that time are transferred to the pixel electrodes associated with that strobe electrode.

In a liquid crystal display device of the present invention, the strobe driving circuit 9 and the signal driving circuit 10 are adapted to put a selected portion of the liquid crystal layer—for example the portion of the liquid crystal layer corresponding to one or more selected pixels—into a first liquid crystal state, by applying an appropriate voltage across the selected portion of the liquid crystal layer. The strobe driving circuit 9 and the signal driving circuit 10 are further adopted to change the magnitude of the voltage applied across the selected portion of the liquid crystal layer while the transmissivity of the selected portion of the liquid crystal layer is greater than the equilibrium value of the transmissivity associated with the first liquid crystal state.

Figure 8A:
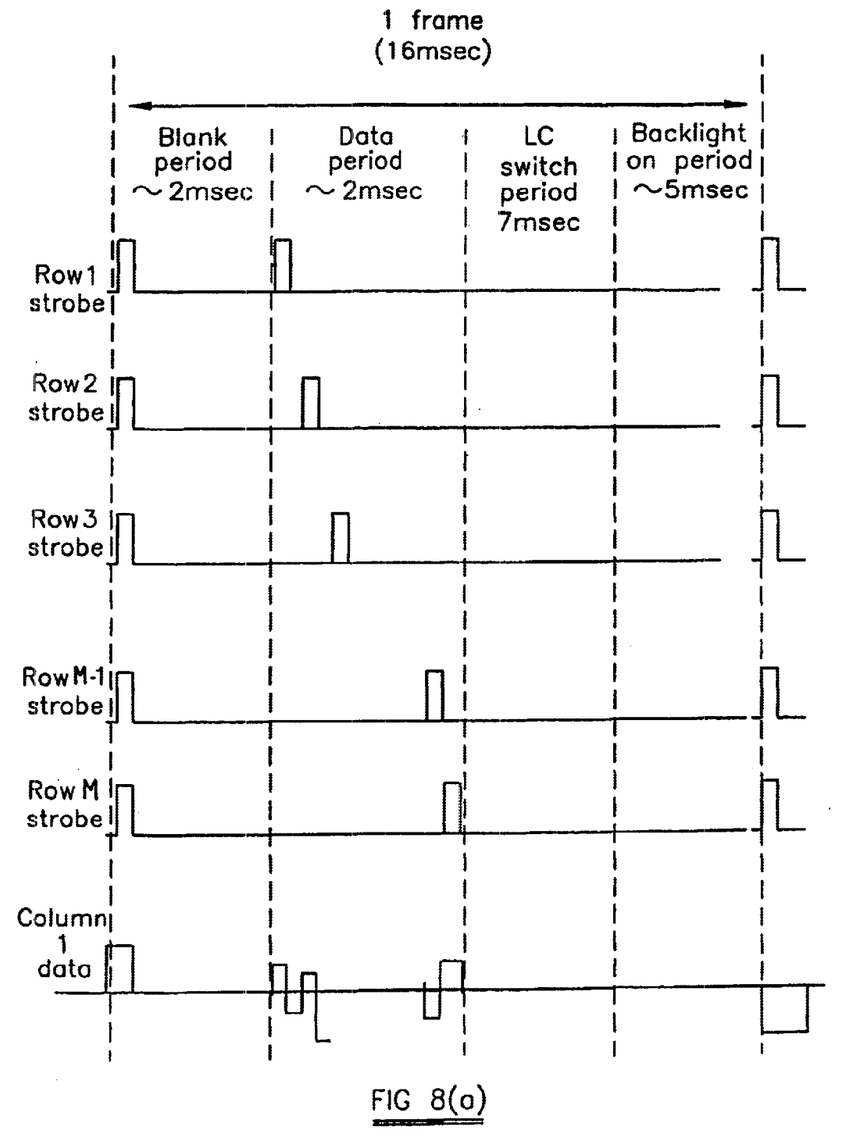
FIG. 8(a) shows schematic driving waveforms for an active matrix pi-cell according to an embodiment of the invention.

FIG. 8(a) illustrates the strobe voltages applied to the strobe electrodes during one frame according to one embodiment of the invention, and also shows the signal voltages applied to one of the column electrodes.

At the start of the frame, a blanking voltage is applied to all pixels of the display. In the embodiment of FIG. 8(a), all pixels are blanked simultaneously. This is done by applying a strobe pulse to all the strobe electrodes $6_i$ simultaneously, to turn on all the switching elements $8_{ij}$ of the display, and applying a blanking voltage to all column electrodes $7_j$.

After the blanking period, there is a data period in which image data is written to all pixels of the display. In the data period the strobe electrodes are selected sequentially. For example, the first strobe electrode $6_1$ is initially selected so that all switching elements whose gate electrode is connected to the first strobe electrode are switched on. Signal voltages corresponding to the desired image data for the first row of pixels are applied to the respective signal electrodes. Then, the second strobe electrode $6_2$ is selected and image data is written into the second row of pixels. This process is continued until image data has been written into the final row (the $M^{th}$ row) of pixels.

The data period is shown as lasting approximately 2 msec in FIG. 8(a), although the precise time will depend on the number of strobe electrodes. The trace of the "column 1 data voltage" in the intermediate portion of the data period has been omitted for clarity.

Once the final strobe electrode has been addressed, and image data has been written into all pixels, there is a switching period in which the pixels are not addressed. The purpose of this period is to allow the transmissivity of the pixels to increase towards its maximum dynamic value. In this period the transmissivity of the pixels increases, as shown in the lower trace of FIG. 5.

Finally, a backlight is turned on for the last portion of the frame. The intensity of the back light will be spatially modulated by the pixels of the device, in accordance with the image data written into the pixels, so that the device will display an image during the period in which the back light is on.

At the start of the next frame, the driving process is repeated by blanking all pixels and applying new image data.

Figure 8B:
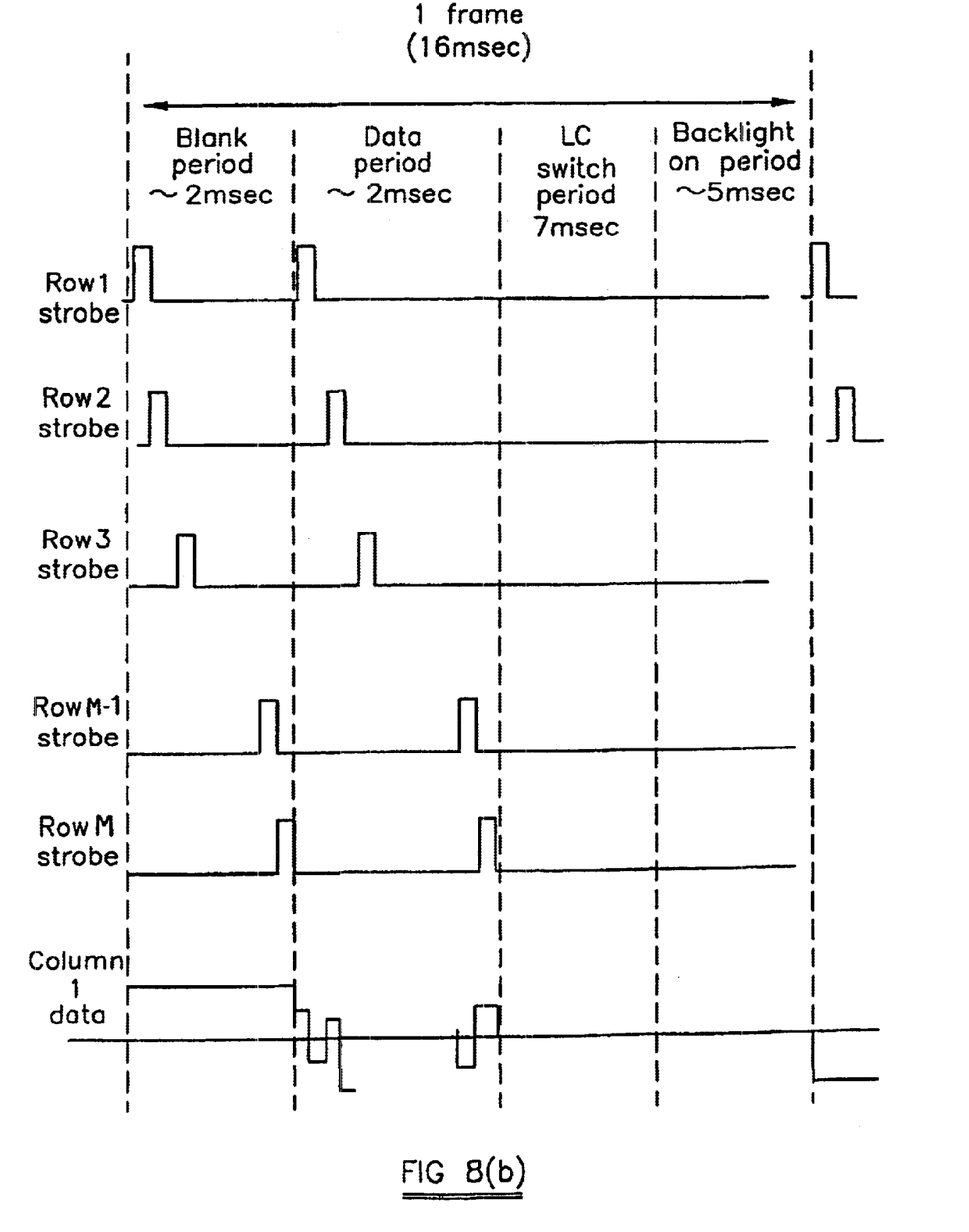
FIG. 8(b) shows schematic driving waveforms according to another embodiment of the invention.

FIG. 8(b) shows a modification of the embodiment of FIG. 8(c). In this embodiment, rows of pixels are blanked sequentially, by selecting the strobe electrodes in sequence during the blanking period.

The times for the blanking period, data writing period, switching period and back light—on period shown in FIGS. 8(a) and 8(b) are examples, and can be varied to suit a particular liquid crystal display device. It is, however, preferable that the durations of the periods are set such that the back light—on period occurs when the transmissivity of the liquid crystal material is at or near the maximum of the transmissivity versus time characteristic shown in FIG. 5, since this allows the brightness of the display to be maximised.

The methods described with relation to FIGS. 8(a) and 8(b) can be varied in many ways. For example, it is possible to apply the blanking voltage less than once per frame—for example, the blanking voltage might be applied only every other frame. This will reduce the overall power consumption of the liquid crystal device, but will result in some loss of reproducibility of the grey scale levels of the display.

In FIGS. 8(a) and 8(b) the same blanking voltage is applied to all pixels of the display. It would, however, be possible to apply different blanking voltages to different regions of the panel. For example, this could be done to alter the viewing angle properties of the display. Alternatively, in the case of a full-colour display in which each pixel contains red, green and blue sub-pixels, it might be desirable to apply different blanking pulses to the red, green and blue sub-pixels making up one pixel.

It would be possible to modify the structure of the device shown in FIG. 7 to incorporate frame-buffering, or pixel-buffering architectures. This would allow pixel image data to be stored on additional capacitive elements of the display device for some period of time before being written to a pixel.

In the driving scheme of FIG. 8(a), the back light is turned on approximately 9 msec after the first strobe electrode has been addressed (the 7 msec switch period and almost the entire 2 msec data period), but only approximately 7 msec after the $M^{th}$ strobe electrode has been addressed. In view of the dynamic variation of the transmissivity of the liquid crystal with time following a change in the applied voltage, this different time delay, for different pixels, before the start of the back light-on period can lead to a different brightness response at different parts of the liquid crystal device. In an alternative embodiment of the invention, that addresses this problem, the strobe electrodes are not addressed in the sequence 1, 2, 3 ... M–1, M. Instead, the rows are addressed in the following sequence: 1, 3, 5, 7 ... M, M–1, M–3 ... 6, 4, 2 (M odd), or 1, 3, 5, M–1, M, M–2 ... 6, 4, 2 (M even). Thus, the first and second strobe electrodes are addressed at the start of the data period and at the end of the data period respectively. By addressing the strobe electrodes in this way, any brightness variation in a particular row of pixels will tend to be compensated by adjacent rows of pixels, since adjacent rows of pixels will have been addressed at different times and so will be at different points along the transmissivity versus time characteristic.

In the embodiments of FIGS. 8(a) and 8(b) the backlight is on only during the backlight-on period. In an alternative embodiment, it would be possible for the backlight to be left on throughout the duration of the frame.

In an alternative embodiment, one or more flashed backlights can be used during the back light—on period, as described by K. Sueoka et al in "Improving the Moving-Image Quality of TFT-LCDs" in "Proceedings of International Display Research Conference" 1997, pp 203–206.

The use of a flashed back light with a liquid crystal display can lead to improved image quality, owing to the way in which the human eye and brain perceive motion of an image.

In the embodiments shown in FIGS. 8(a) and 8(b), a blanking pulse is applied at the start of each frame, to simplify the task of ensuring that identical applied voltages lead to identical transmissivities in different frames. In principle, however, blanking can be applied less than once in each frame, or even omitted completely, provided that some record of the voltage history of a pixel is obtained. If a record of the pixel's voltage history is kept, this record will enable the director structure in the pixel to be determined before applying a particular voltage, so that the effects of applying the new voltage can be determined with reasonable certainty.

In order to maintain a record of the pixel's voltage history and thus allow the frequency of the blanking voltages to be reduced, or even allow the complete elimination of blanking voltages, it is possible to associate memory and/or computing power with the display for the purpose of keeping a record of the director structure in the pixel. For example, a RAM chip could be bonded to the substrate of the display, or silicon substrate having computational circuitry etched into it could be used in place of a conventional glass substrate.

The invention has so far been described with reference to a surface mode liquid crystal display in which the twist angle of the liquid crystal molecules is 180°. However, surface mode operation can be achieved for liquid crystal displays having twists of other than 180°, and the present invention is therefore not intended to be limited to a display having a twist angle of precisely 180°. For example, European Patent publication EP-A-0 816 906 discloses a surface mode LCD having a twist other than 180°, and the present invention can be applied to such a device.

In the liquid crystal display devices described above, the pre-tilt angles on the two substrates are substantially equal, usually less than 45° and typically in the range 2–10°. The invention can, however, be applied to a pi-cell in which the pre-tilt angles on the two substrates are different. For example, the pre-tilt angle on one substrate can be substantially 0°. It is also possible for the substrates to have a sub-pixelated alignment of the type disclosed in Japanese patent application JP-H11 150 722 (filed May 28, 1999).

The embodiments described above relate to a transmissive display device. The invention is not, however, limited to a transmissive device, but may be applied to a reflective or transflective device.

In the embodiments described above, the display is a pixellated display that includes an active matrix substrate for driving the individual pixel electrodes. The invention is not limited to this particular display. For example, rather than providing each pixel electrode with its own switching element to control the voltage applied to the pixel electrodes, it is possible to use an array of gas-filled channels to selectively apply voltages to the pixel electrodes, in the manner of the so-called PALC display described in U.S. Pat. No. 4,896,149 and GB-A-2 326 245.

A typical value of the thickness-to-pitch ratio, d/p, for a 180° twist pi-cell is approximately 0.25. Although a value of d/p=0.5 gives an exact match between the intrinsic pitch of the liquid crystal material and the thickness of the liquid crystal layer, it is necessary for the liquid crystal to conform to the rubbing directions of the alignment films on the two substrates. The liquid crystal layer in a pi-cell geometry in which the alignment directions of the two substrates are parallel to one another is therefore constrained to have a twist of 0°, 180°, 360°, etc. In order to obtain a 180° twist, it is therefore only necessary to bias the pitch of the liquid crystal molecules just enough to favour the twist angle of 180° over a twist angle of 0°, and this is achieved by making the value of d/p greater than 0.25. It is often preferable to minimise the amount of chiral dopant so as to minimise unwanted residual twist at high applied voltages, and for this reason it is common to use a d/p value of slightly greater than 0.25 in order to obtain a 180° twist in a pi-cell device. The d/p value of the liquid crystal cell may be selected so as to optimise the extent of the variation of the transmissivity with time following a change in the applied voltage. This allows the temporal variation of the transmissivity to be matched to the duration of a frame and to the duration of the blanking period.

Figure 9:
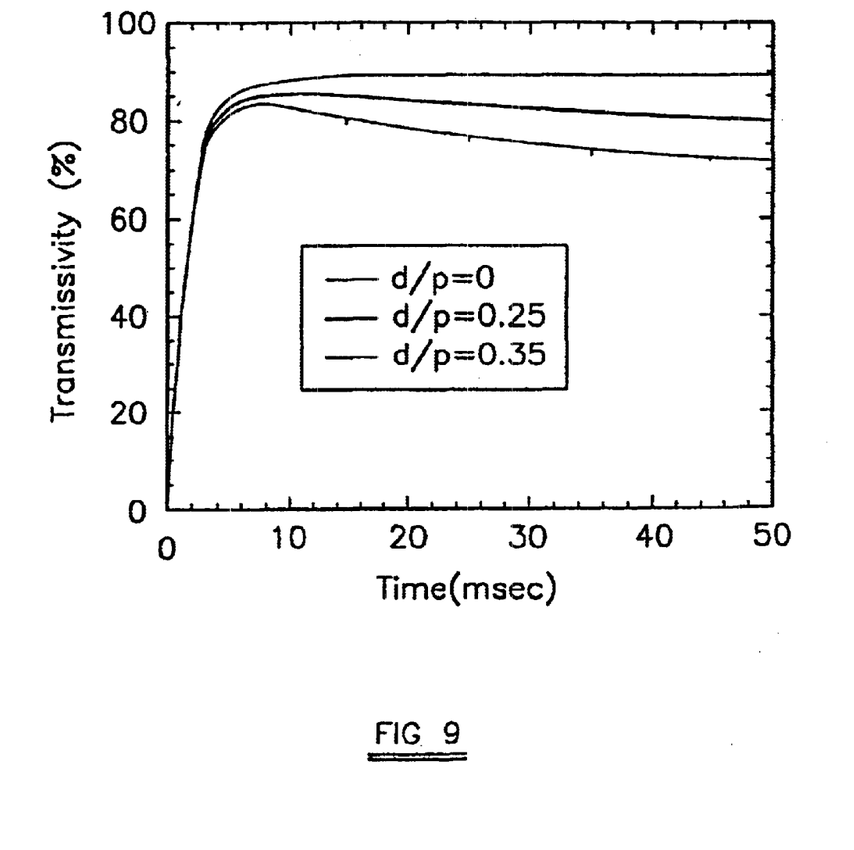
FIG. 9 shows the effect of the thickness-to-pitch ratio of the liquid crystal layer on the temporal variation in transmissivity after a reduction in the voltage applied to a pi-cell.

FIG. 9 shows the temporal variation of transmissivity of a pi-cell containing a 6.3 µm thick layer of liquid crystal E7, with the pre-tilt angle at each substrate being 5°. FIG. 9 shows the variation in the brightness when the applied voltage is changed from 5.5V, for three values of the ratio d/p. The curve having the ratio d/p=0 relates to a liquid crystal layer having a twist angle of 0° (and thus an infinite pitch), and is therefore outside the scope of this invention. The curve for d/p=0 has been included for comparison purposes.

It will be seen that the smaller is the d/p ratio, the slower is the rate of decrease of the transmissivity from its peak value. That is, a lower d/p ratio results in less temporal variation in the transmissivity of the liquid crystal layer once the peak transmissivity has been reached, so that selecting a low, but finite, d/p value will minimise the variation in transmissivity that occurs over the duration of a frame. For a relatively long frame time, or when using a flashed backlight when the lamp is illuminated for a relatively long period of time, it is therefore best to use a liquid crystal layer with a low d/p ratio to minimise variations in transmissivity over the frame, whereas for short frame times liquid crystal layers with higher d/p values can be used.

Another factor which affects the temporal variation of the transmissivity of a liquid crystal layer when the applied voltage is changed from a blanking voltage $V_{blank}$ to a new voltage $V_{new}$ is the value of $V_{blank}$. The temporal variation in the transmissivity will also depend upon the viscous properties of the liquid crystal material, and these will be affected by the temperature of the cell. The effect of changes in temperature upon the temporal variation of the liquid crystal material after switching can be important—a liquid crystal panel used in a projection system, for example, can undergo a considerable change in temperature when the projection lamp is turned on. In a further embodiment of the invention, therefore, the magnitude of the blanking voltage is varied as the temperature of the panel is varied, to compensate for the changes in the viscous properties of the liquid crystal.

The temporal variation of the transmissivity of the liquid crystal layer after switching is also affected by the three elastic constants of the liquid crystal material. It is therefore desirable to select the elastic constants of the liquid crystal material to optimise the temporal variation of the transmissivity.

The liquid crystal layer of a device to which the driving method of the invention is applied may contain a polymer material. For example, the liquid crystal layer may contain a reactive mesogen polymer material which is itself chiral and which contributes to the twist of the liquid crystal molecules.

It is also possible to compensate for variations in operating temperature of the device by selecting a chiral dopant that induces a temperature-dependent pitch in the twist of the liquid crystal molecules. The viscosity of a liquid crystal material generally increases with temperature, and this effect can be counteracted by selecting a chiral dopant that induces a pitch which decreases with temperature in the liquid crystal.

Although the present invention has been described with particular relevance to a pi-cell, it can be applied to other surface—mode liquid crystal display devices.

In principle, the present invention can be applied when the voltage across a liquid crystal layer is increased. However, a liquid crystal generally responds to an increase in voltage much more quickly than to a decrease, and the latter is therefore the rate limiting process in driving a liquid crystal display.

The present invention can be applied to a surface-mode liquid crystal display device, such as for example a pi-cell that is disposed between first and second linear polarises whose transmission axis are perpendicular to one another. When a surface-mode liquid crystal display device is disposed between crossed linear polarisers in this way, the "white" operating state of the liquid crystal layer will occur at a lower applied voltage across the liquid crystal layer than will the "dark" operating state. The present invention provides a "white" state that has a greater transmissivity, and thereby increases the contrast of the device.

When the liquid crystal device is disposed between crossed linear polarizers, the transmission axis of the polarisers are preferably at approximately 45° to the optic axis of the liquid crystal layer.

The invention has been described above with reference to a transmissive display device. The present invention is not limited to a transmissive device, however, but can also be applied to a surface mode liquid crystal display device that is disposed between a polariser and a reflector and is operated in a reflective mode.

In the case of a reflective device, the brightness of the device is proportional to its reflectivity. The reflectivity, and hence the brightness, of a reflective device can be increased in a similar manner to that described above for a transmissive device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method of driving a surface mode liquid crystal display device including a liquid crystal layer having a non-zero twist angle, the method comprising the step of:
   applying a first voltage having a first magnitude across the liquid crystal layer to put the liquid crystal layer into a first liquid crystal state;
   characterized in that it further comprises changing the magnitude of the voltage applied across the liquid crystal layer while the brightness of the liquid crystal device is greater than the equilibrium value of the brightness associated with the first liquid crystal state.

2. A method as claimed in claim 1 wherein the step of changing the magnitude of the voltage applied across the liquid crystal layer is performed before the director of liquid crystal molecules in the centre in a thickness direction of the liquid crystal layer has substantially reached its equilibrium orientation associated with the first liquid crystal state.

3. A method as claimed in claim 1 wherein the step of changing the magnitude of the voltage applied across the liquid crystal layer is carried out after no more than 50% of the time required for the brightness of the liquid crystal device substantially to reach the equilibrium value associated with the first liquid crystal state.

4. A method as claimed in claim 1 wherein the step of changing the magnitude of the voltage applied across the liquid crystal layer is carried out after approximately 32% of the time required for the brightness of the liquid crystal device substantially to reach the equilibrium value associated with the first liquid crystal state.

5. A method as claimed in claim 1 wherein the step of changing the magnitude of the voltage applied across the liquid crystal layer is carried out no later than approximately 16 msec after the step of applying the first voltage.

6. A method as claimed in claim 1 and further comprising the step of putting the liquid crystal layer into a known liquid crystal state before performing the step of applying the first voltage.

7. A method as claimed in claim 6 wherein the step of putting the liquid crystal layer into a known liquid crystal state comprises applying a blanking voltage to the liquid crystal layer.

8. A method as claimed in claim 7 wherein the magnitude $V_{blank}$ of the blanking voltage is dependent on the temperature of the liquid crystal layer.

9. A method as claimed in claim 1 wherein the liquid crystal layer contains a chiral dopant.

10. A method as claimed in claim 9 wherein the chiral dopant has a temperature dependent pitch.

11. A method as claimed in claim 10 wherein the viscosity of the liquid crystal layer increases with the temperature of the liquid crystal layer, and the pitch induced by the chiral dopant in the liquid crystal decreases with temperature.

12. A method as claimed in claim 9 wherein the chiral dopant induces a twist in the director of the liquid crystal molecules having a pitch p such that d/p=0.25, where d is the thickness of the liquid crystal layer.

13. A method as claimed in claim 9 wherein the chiral dopant induces a twist in the director of the liquid crystal molecules having a pitch p such that $d/p \geq 0.25$, where d is the thickness of the liquid crystal layer.

14. A method as claimed in claim 9 wherein the chiral dopant induces a twist in the director of the liquid crystal molecules such that $0.25 \leq d/p \leq 0.5$.

15. A method as claimed in claim 1 wherein the twist angle of the liquid crystal layer is substantially 180°.

16. A method as claimed in claim 1 wherein the liquid crystal display device is an active matrix display device comprising an array of pixels each pixel defined by a corresponding pixel electrode, M strobe electrodes and N signal electrodes, the method comprising, in a frame, the steps of:
   (a) applying a blanking voltage to each of the pixels;
   (b) applying a respective signal voltage corresponding to desired image data to each of the pixels;
   (c) allowing the liquid crystal molecules to switch states; and
   (d) displaying the image.

17. A method as claimed in claim 16 wherein step (a) comprises applying the blanking voltage substantially simultaneously to all pixels.

18. A method as claimed in claim 16 wherein step (a) comprises applying the blanking voltage to pixels associated with each strobe electrode in sequence.

19. A method as claimed in claim 16 wherein step (b) comprises applying the signal voltages to pixels associated with each strobe electrode in the sequence 1, 3, 5, . . . M, M−1, M−3, . . . 6, 4, 2 (M odd) or 1, 3, 5 . . . M−1, M, M−2, . . . 6, 4, 2 (M even).

20. A method as claimed in claim 16 wherein the combined duration of steps (a) to (d) is substantially 16 msec and the duration of step (c) is substantially 7 msec.

21. A method as claimed in claim 16 wherein the display device comprises a backlight, and the backlight is on during all of steps (a) to (d).

22. A method as claimed in claim 16 wherein the display device comprises a backlight wherein the backlight is on for only part of a frame.

23. A method as claimed in claim 22 wherein the backlight is off during step (a).

24. A method as claimed in claim 16 wherein the device is a pi-cell.

25. A surface mode liquid crystal display device comprising: a liquid crystal layer having a non-zero twist angle; means for applying a first voltage having a first magnitude across a selected portion of the liquid crystal layer to put the selected portion of the liquid crystal layer into a first liquid crystal state; and means for changing the magnitude of the voltage applied across the selected portion of the liquid crystal layer while the brightness of the part of the liquid crystal device corresponding to the selected portion of the liquid crystal layer is greater than the equilibrium value of the brightness associated with the first liquid crystal state.

* * * * *